US012618264B1

(12) United States Patent
Levy

(10) Patent No.: US 12,618,264 B1
(45) Date of Patent: May 5, 2026

(54) PRIVACY SYSTEM FOR ELECTRONIC DOOR LOCKS

(71) Applicant: Peter L. Levy, San Francisco, CA (US)

(72) Inventor: Peter L. Levy, San Francisco, CA (US)

( * ) Notice: Subject to any disclaimer, the term of this patent is extended or adjusted under 35 U.S.C. 154(b) by 0 days.

(21) Appl. No.: 19/338,946

(22) Filed: Sep. 24, 2025

(51) Int. Cl.
*E05B 17/00* (2006.01)

(52) U.S. Cl.
CPC .................................... *E05B 17/00* (2013.01)

(58) Field of Classification Search
CPC ....................................................... E05B 17/00
See application file for complete search history.

(56) References Cited

U.S. PATENT DOCUMENTS 5,550,529 A * 8/1996 Burge ................ G07C 9/00896 70/447
6,658,906 B1 * 12/2003 Wright .................. E05B 13/001 70/424
8,534,103 B2 * 9/2013 Brooks ................. E05B 13/001 70/423
8,756,965 B1 * 6/2014 Anderson ............. E05B 13/001 292/264
8,869,574 B2 * 10/2014 Schmidt-Lackner ........................ E05B 47/068 70/277
11,313,149 B2 * 4/2022 Morrison .............. E05B 17/142
2009/0229323 A1 * 9/2009 Dykstra ................ E05B 13/001 292/341.14
2011/0016938 A1 * 1/2011 Chi ..................... E05B 65/0035 70/432
2015/0013400 A1 * 1/2015 Acácio Da Silva ..... G07C 9/37 70/101
2016/0024817 A1 * 1/2016 Denison .............. E05B 47/0012 70/85
2018/0102012 A1 * 4/2018 Cahill ........................ E05B 9/00
2023/0042058 A1 * 2/2023 N'Guessan ........... E05B 1/0084
2025/0234062 A1 * 7/2025 Fang ................ H04N 21/43615

* cited by examiner

*Primary Examiner* — Mark A Williams
(74) *Attorney, Agent, or Firm* — PATENT Alchemy

(57) ABSTRACT

Current privacy notices on door are inadequate for electronic door locks. An electronic door lock "do not disturb" privacy device is presented.

11 Claims, 4 Drawing Sheets

PRIVACY SYSTEM FOR ELECTRONIC DOOR LOCKS

BACKGROUND

Field of the Invention

The present invention relates generally to electronic door locks and specifically to electronic door lock occupant privacy.

Background of the Invention

There are several ways to let non-occupants in a hotel/motel know that an occupant secured by an electronic lock require privacy and do not wish to be disturbed currently. The reasons are, even when available, current hotel "Do Not Disturb" signs, and there are several, have practical use and design shortcomings.

First, there are the visibility issues: signs often fall off or get knocked down, leaving guests unprotected, sometimes small size makes them hard to see from a distance, poor contrast/colors make them difficult to read in dim hallway lighting and single-sided design means they're not visible from all angles. What is needed are ways to clearly indicate that Privacy is required no matter the visibility of the electronic door lock.

Second, communication problems: Binary system-only "disturb" or "don't disturb" with no nuance, there are no way to communicate specific needs (clean later, deliver packages, emergency contact OK), no indication of when the guest will be available, and there are language barriers for international travelers or language illiterate staff. What needed are more definitive Privacy indications where the communication is not ambiguous and specific.

Third, physical durability: Cheap paper/cardboard that tears or becomes illegible, fading text from repeated handling, and no weather resistance if used on outdoor-facing doors. What is needed are privacy display solutions that do not fade or weather away, and can be seen even in the dark if the lights were to go out for any reason.

Forth, security concerns: advertises that someone is in the room, potential security risk, and no way to verify if it's legitimate or placed by someone else. Sometimes this doesn't prevent well-meaning staff from knocking "just to check". What is needed are a more a system that doesn't increase security risk.

Last, a lack of Integration: there is no connection to hotel systems (housekeeping schedules, room service), staff can't remotely see room status, and there is no digital tracking or confirmation. What is needed is some kind of integration method for house keeping and administration staff. What is needed are 21$^{st}$ century solutions to privacy in an increasingly digital hospitality environment.

What is needed are simple privacy devices which can be quickly installed or even replaced from existing devices for electronic door locks.

SUMMARY

The present invention discloses a portable electronic door lock privacy device. A cover for the device is of shape configured for a an electronic door lock housing and dimensions larger than an electronic door lock housing an electronic reader mechanism. The cover is made to fit above and shield the electronic door lock housing from general electronic lock opening mechanisms in the elock reader and has a lip more-or-less perpendicular to the cover and of dimension configured for the cover placement above the electronic door lock reader and electronic door lock housing, for protecting the electronic door lock reader from card insertion or electronic lock unlocking signal. The cover has two horizontal edges, with one horizontal edge extending across the width of the cover and the other horizontal edge having a curved edge adjacently conforming with a door handle base.

The device has a flexible band with two ends further coupling the cover to the door and a magnet affixed to the inside of the cover magnetically coupling the cover to the electronic door lock housing which extends over electronic reader. On the cover surface is a continuous conductive barrier layers without gaps to shield electromagnetic signal, physical contact, light and or wireless electronic signal from reaching the electronic door lock reader such that an electronic door lock with the removable privacy device shielding the electronic door lock will prevent unlocking the electronic door lock acting as a modern "do not disturb" sign. The device cover is conformable to various standard electronic door lock housing.

BRIEF DESCRIPTION OF DRAWINGS

Specific embodiments of the invention will be described in detail with reference to the following figures.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

OBJECTS AND ADVANTAGES

An object of the invention is to provide ways to clearly indicate that Privacy is required no matter the visibility of the electronic door lock.

Another object of the invention is provide more definitive Privacy indications where the communication is not ambiguous and specific.

Yet another object of the invention would be to provide privacy display solutions that do not fade or weather away.

Yet still another objective of the invention is to prevent well-meaning staff from knocking "just to check".

Yet still another objective of the invention is a privacy required system on an electric door lock that doesn't increase security risk.

Another object of the invention is provide 21st century solutions to eDoor lock privacy in an increasingly digital hospitality environment.

Another object of the invention is to provide a privacy device that does not pose a problem for the hospitality fire and safely protocols and can be reached or dismantled from outside of door the electronic door lock

FIGURE DETAILS

Figure 1:
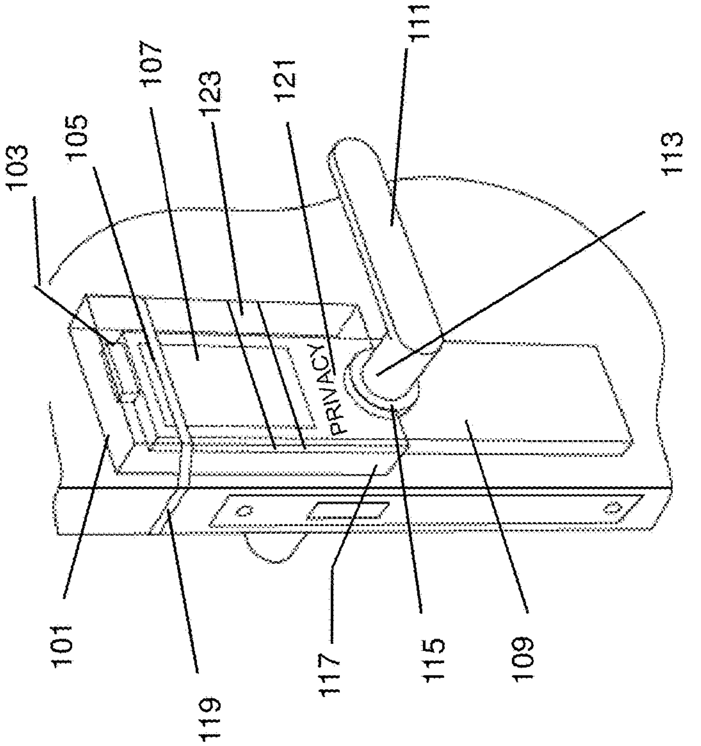
FIG. 1 illustrates an electronic door lock privacy device in an embodiment of the invention

FIG. 1 illustrates an electronic door lock privacy device in an embodiment of the invention.

The electronic door privacy device consists of a removable opaque fame, cover or plate of sufficient size to fit over and cover the entire section of the hotel electronic door lock housing. Current electronic door locks are wireless type, slot enabled or numerical combination button types. The invention privacy device will fit over all types of door electronic locks and including physical contact type or wireless signal type elocks unless and until the privacy device is first removed.

In an embodiment the cover or plate may have a magnet component to hold the cover to metal door lock. The entire cover 109 is made of hard material opaque to light, and EM shielding layer to prevent an electronic card from unlocking the electronic lock 107 without first removing the privacy device. The cover will have EM shield layer containing a Faraday shield and or metal layer to prevent a wireless signal from reaching the clock reader and unlocking the door. The privacy device can be easily disabled or removed but must be done so with deliberate intent, as a privacy message on the device will clearly show the purpose of the privacy device. The Faraday shield or a cover EM stopping layer can be defeated by merely pulling the top part of the device cover plate away from the electronic reader so that the electronic card or fob can be inserted in the slot or swiped to open the door lock. Simple disablement of the privacy shield gives access to the interior of the room in case of a medical or fire emergency enabling the medical staff or the fire marshal to enter the room.

In a preferred embodiment a removable and hence portable privacy device for an electric door lock a will have a rectangular cover 117 of dimensions larger than an electronic door lock housing 109 and elock reader 107/The cover 117 is made to fit above and shield the electronic door lock housing 109 from the general opening mechanisms in the clock reader 107. The cover 117 has a lip 101 more-or-less perpendicular to the cover 117 and of dimension for fitting above the electronic door lock reader 107 and electronic door lock housing 109 protecting the electronic door lock reader 107 from card insertion or unlocking signal lock opening. The cover includes two horizontal edges, with one horizontal edge 101 extending across the width of the cover and the other horizontal edge having a curved edge 115 adjacently conforming with a door handle 111 base 113. A magnet 103 is coupled to the inside of the cover 117 magnetically coupling the cover 117 to the electronic door lock housing 109 which extends over electronic reader 107. The cover 117 is of material composite layers to shield electromagnetic signal, physical contact, light and or wireless electronic signal from reaching the electronic door lock reader 107. An illumination strip 123 and a text notice 121 of privacy required by occupants may be included in an embodiment. The result is an electronic door lock with the removable privacy device shielding the electronic door lock will prevent unlocking the electronic door lock acting as a modern “do not disturb” sign.

Figure 2:
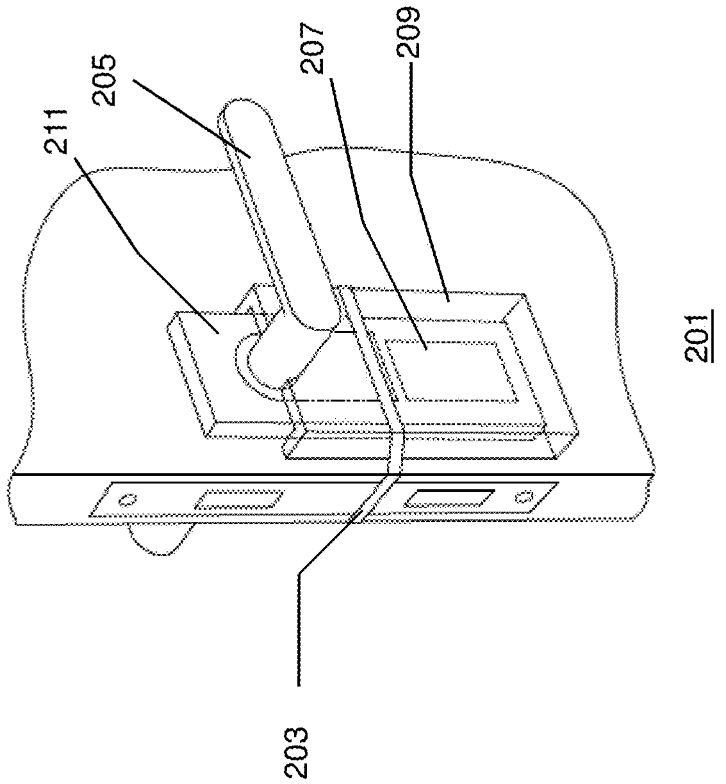
FIG. 2 shows a detailed illustration of a rectangular cover privacy device 201 for an electronic door lock locked slightly below a door handle.

FIG. 2 shows a detailed illustration of a rectangular cover privacy device 201 for an electronic door lock locked slightly below a door handle.

Electronic door locks are provide in slightly different styles, shapes and modes in a competitive industry. An objective in this embodiment is to provide a privacy device conformable to the various electronic door lock shapes, sizes and configurations. Here a more-or-less rectangular cover 209 protects an electronic door lock reader 207 below a the door handle 205 enclosed in an electronic door lock housing 211

Figure 3:
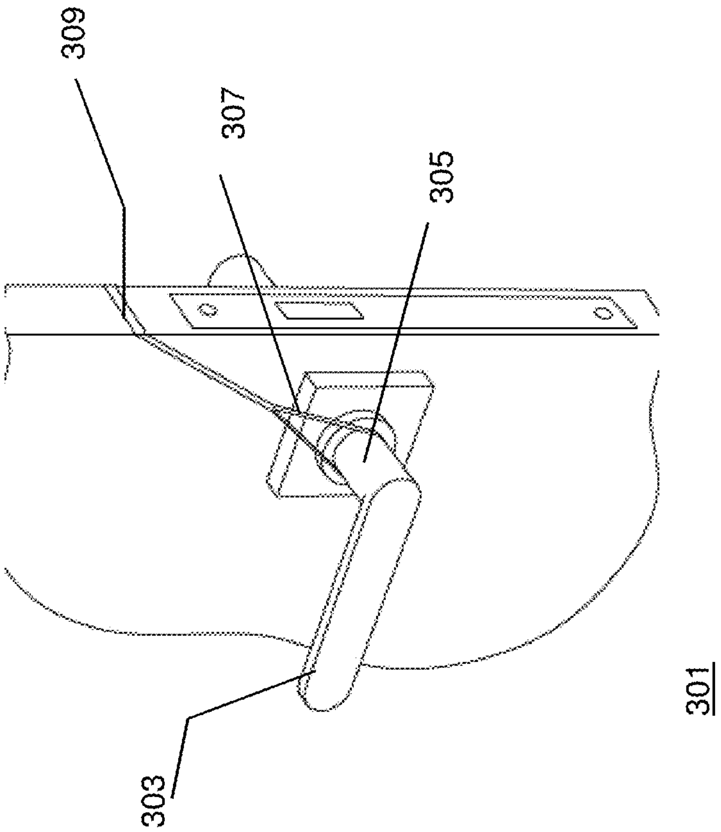
FIG. 3 illustrates a flexible band coupling to a door in an aspect of the invention.

FIG. 3 illustrates a flexible band coupling to a door in an aspect of the invention.

In an embodiment of the invention the privacy device cover plate is coupled to the door lock with a flexible band with two ends, one band end is coupled to the privacy device cover and the second end band 309 is extended to the door interior having a slot or opening 307 large enough to slip over the interior door handle 303 and onto the handle base 305. In another embodiment the flexible band 309 has an opening midway which slips over the door bolt and or extends around to the inside of the door, looped around and coupled to the inside door handle 305 opposite the privacy device.

The removable privacy device for an electronic door lock has a flexible band end coupled to the privacy device cover and the other flexible band end is extended around to the inside of the door and coupled to the door inside door handle. Stretchable band material is used in looping the flexible band over a handle. Hook and loop coupling can also be used.

Figure 4:
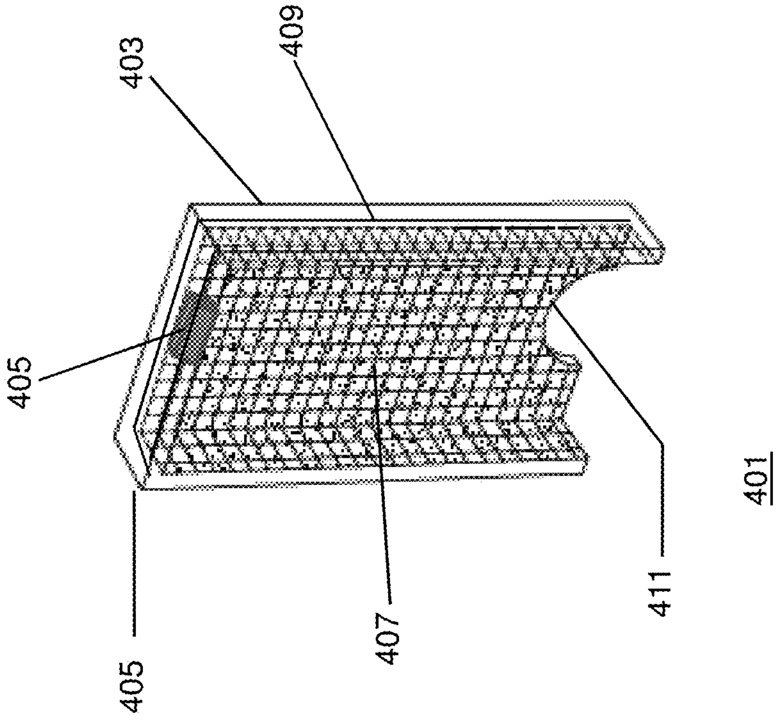
FIG. 4 shows a detailed illustration of the privacy device cover and cover conductive barrier layers to provide shielding for an electronic door lock.

FIG. 4 shows a detailed illustration of the privacy device cover material to provide removable shielding for an electronic door lock. Shielding or blocking RF or wireless signal in an aspect of the invention which can take on several forms.

Wireless Signal and RF Blocking

For wireless signal and RF blocking a device cover, typically of plastic, will contain material to block RF signals, a Faraday cage 407 effect, which requires conductive materials like metal or RF-shielding fabrics. The cover 403 material can be plastic, composite or other light weight synthetic material. Conductive materials will be in the form of layers 409 inside of the cover 403, common layer 409 material could include graphene and:

- Aluminum foil: A layer as thin as 0.02 mm (20 microns) can block most NFC and key fob signals if it fully encloses the device.
- Copper or steel layer: Thin sheets (0.1-0.5 mm) can be used, depending on the signal strength.
- RF-shielding fabrics: These can block signals with thicknesses as low as 0.1 mm.

The cover RF shielding material will form a layer continuous conductive barrier without gaps to prevent signal leakage.

Therefore, while the invention has been described with respect to a limited number of embodiments, those skilled in the art, having benefit of this invention, will appreciate that other embodiments can be devised which do not depart from the scope of the invention as disclosed herein. Other aspects of the invention will be apparent from the following description and the appended claims.

What is claimed is:

1. A portable privacy device for attachment to an standard electronic door lock for providing “do not disturb” privacy for room occupants, the portable privacy device comprising:

a cover of a shape and material configured for covering a standard electronic door lock housing such that the cover having dimensions larger than the electronic door lock housing when covering the electronic door lock housing, wherein the electronic door lock housing comprises an electronic reader mechanism;

the cover is made to conformably fit above and shield the electronic door lock housing from allowing for the general operation of the electronic reader mechanism for releasing an electronic door lock for opening the door;

the cover has a lip at least substantially perpendicular to the cover and of dimensions configured for the cover's placement above the electronic reader mechanism and the electronic door lock housing, for protecting the electronic reader mechanism from card insertion or from receiving a wireless electronic lock unlocking signal;

the cover includes two horizontal edges, with one horizontal edge extending across the width of the cover and the other horizontal edge having a curved edge configured for adjacently conforming with a door handle base;

a flexible band with two ends further coupling the cover to the door; a magnet is affixed to the inside of the cover for magnetically coupling the cover to the electronic door lock housing, where the cover extends over electronic reader mechanism; and the cover being configured with continuous conductive barrier layers, the barrier layers are configured without gaps so as to shield any one or more of an electromagnetic signal, physical contact, light, and/or a wireless electronic signal from reaching the electronic door lock reader mechanism:

whereby the portable privacy device is configured to provide a removable privacy device shielding for the electronic door lock that will prevent unlocking the electronic door lock, thereby acting as a "do not disturb" sign.

2. The portable privacy device for an electronic door lock as in claim 1 further comprising a cover that is conformable to various standard electronic door lock housing shape.

3. The portable privacy device for an electronic door lock as in claim 1 further comprising a flexible band end coupled to the cover and the other flexible band end extended around to the inside of the door and coupled to the door inside door handle.

4. The portable privacy device for an electronic door lock as in claim 1 wherein the cover material comes from a set of material including plastic, composite and light weight synthetics.

5. The portable privacy device for an electronic door lock as in claim 1 wherein the continuous conductive barrier without gap layers material comes from a set of materials including aluminum, copper, RF-shielding fabrics, graphene and other metals.

6. A method for providing a portable privacy device for an electronic door lock, the method comprising the steps of:

providing a cover of shape configured for covering an electronic door lock housing and the cover having dimensions larger than an electronic door lock housing and an electronic reader mechanism:

making the cover configured to fit above and shield the electronic door lock housing from general operation of the electronic reader mechanism for preventing operation of an electronic door lock mechanism via the electronic reader mechanism:

creating a lip on the cover at least substantially perpendicular to the cover and of dimensions configured for the cover's placement above the electronic door lock reader and electronic door lock housing, for protecting the electronic door lock reader from card insertion or from receiving an electronic lock wireless unlocking signal;

configuring the cover with two horizontal edge, with one horizontal edge extending across the width of the cover and the other horizontal edge having a curved edge configured for adjacently conforming with a door handle base:

providing a flexible band with two ends further coupling the cover to the door;

affixing a magnet to the inside of the cover for magnetically coupling the cover to the electronic door lock housing such that the cover extends over electronic reader mechanism, and layering continuous conductive barrier layers without gaps on the cover to shield electromagnetic wireless signals, physical contact, light and/or wireless electronic signals from reaching the electronic door lock reader mechanism:

whereby an electronic door lock with the removable privacy device covering and shielding the electronic door lock will prevent unlocking the electronic door lock thereby acting as a "do not disturb" sign without intention.

7. The method for a portable privacy device for an electronic door lock as in claim 6 further comprising the step of shaping the cover that is conformable to various standard electronic door lock housing.

8. The method for a portable privacy device for an electronic door lock as in claim 6 further comprising the step of adding an illumination strip on the cover.

9. The method for a portable privacy device for an electronic door lock in as claim 6 further comprising the step of providing one flexible band end coupled to the cover and the other flexible band end extended around to the inside of the door and coupled to the door inside door handle.

10. The method for a portable privacy device for an electronic door lock as in claim 6 wherein the cover material comes from a set of material including plastic, composite and light weight synthetics.

11. The method for a portable privacy device for an electronic door lock as in claim 6 wherein the continuous conductive barrier without gap layers material comes from a set of materials including aluminum, copper, RF-shielding fabrics, graphene and other metals.

* * * * *